(12) United States Patent
Burdick et al.

(10) Patent No.: US 7,770,399 B2
(45) Date of Patent: Aug. 10, 2010

(54) GAS TURBINE ENGINE NOZZLE LINER WITH THERMALLY COMPLIANT ATTACHMENT BRACKETS

(75) Inventors: Andrew D. Burdick, Ellington, CT (US); Kyle J. Osga, Windham, CT (US); Paul R. Senofonte, Portland, CT (US); Richard F. Norman, West Warren, MA (US); Alex J. Simpson, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 985 days.

(21) Appl. No.: 11/540,310

(22) Filed: Sep. 29, 2006

(65) Prior Publication Data

US 2008/0078163 A1 Apr. 3, 2008

(51) Int. Cl.
*F02K 1/00* (2006.01)
(52) U.S. Cl. ........................ 60/770; 60/771; 239/265.39
(58) Field of Classification Search .................... 60/770, 60/771, 226.1, 796, 779, 39.091, 39.094; 239/265.39, 265.41, 265.33, 265.37, 265.19; 220/745–750
See application file for complete search history.

(56) References Cited

U.S. PATENT DOCUMENTS

| 3,712,547 | A | * | 1/1973 | Smale et al. | ........... 239/265.39 |
| 3,972,475 | A | * | 8/1976 | Nelson et al. | ............ 239/127.3 |
| 7,555,904 | B1 | * | 7/2009 | Osga et al. | ..................... 60/771 |
| 7,617,685 | B2 | * | 11/2009 | Norman et al. | ................ 60/770 |
| 2008/0078161 | A1 | * | 4/2008 | Norman et al. | ............ 60/226.1 |
| 2009/0313998 | A1 | * | 12/2009 | Senofonte et al. | ............. 60/771 |

* cited by examiner

*Primary Examiner*—William H Rodríguez
*Assistant Examiner*—Vikansha S Dwivedi
(74) *Attorney, Agent, or Firm*—Carlson, Gaskey & Olds

(57) ABSTRACT

A gas turbine engine has the convergent flaps and seals of an adjustable cross-sectional area nozzle connected to associated liners with a thermally compliant bracket. The bracket includes spaced feet with an intermediate notch spaced away from the liner. In this manner, a temperature gradient along the liner can be easily compensated at the connection of the bracket to the liner by adjustment within the notch. In other features, the bracket is riveted to the liner, providing further resistance to thermal expansion due to temperature gradiations.

16 Claims, 5 Drawing Sheets

GAS TURBINE ENGINE NOZZLE LINER WITH THERMALLY COMPLIANT ATTACHMENT BRACKETS

This invention was made with government support under U.S. Navy Contract No. N00019-02-C-3003. The government therefore has certain rights in this invention.

BACKGROUND OF THE INVENTION

This application relates to a bracket for attaching liners to the convergent flaps and seals which are part of a convergent/divergent nozzle for a gas turbine engine, and wherein the brackets are more thermally compliant than in the prior art.

A gas turbine engine typically includes a plurality of sections, which are positioned in series. A fan section moves air downstream towards a compressor section. The compressor section compresses the air and delivers it into a combustion section. In the combustion section, air and fuel are mixed and combusted. Products of combustion pass downstream over turbines, and then outwardly through a nozzle.

It is known in the prior art to vary the cross-sectional area of the nozzle by having flaps that pivot inwardly and outwardly. Typically, a plurality of circumferentially spaced flaps and seals are positioned upstream of a throat, and are called the convergent flaps and seals. Downstream of the throat are divergent flaps and seals. The convergent flaps and seals not only move to define the throat area, but they also provide a block for the products of combustion reaching a housing outboard of the flaps and seals.

In the structure for the convergent flaps and seals, a liner typically faces the products of combustion. The liner is connected by a bracket to the flap or seal. Traditionally, the bracket has been welded to the hot liner. The bracket is then bolted to the cooler flap or seal.

In the prior art, the brackets have proved challenging to mount to the hot liner. In particular, the liner extends over a portion of the length of the nozzle, and as one moves downstream in the nozzle, the liner is subject to greater heat. This is true for several reasons, one being the fact that cooling air is mixed into the nozzle at a position upstream. This cooling air has lesser and lesser effects as one moves downstream.

At any rate, the bracket is subject to a thermal gradient along the length of its connection to the hot liner. The bracket has been welded along its entire length to the hot sheet. This provides a relatively rigid connection which is not able to adjust to thermal gradiations. In the prior art, very thermally resistant materials (having a low coefficient of thermal expansion) have been utilized for the bracket and hot plate. However, this sometimes proves to be an undesirable constraint.

SUMMARY OF THE INVENTION

In a disclosed embodiment of this invention, a bracket attaches a liner to both the convergent flaps and seals. The bracket has a footprint of attachment to the relatively hot liner that includes pairs of spaced legs. These contact surfaces between the bracket and the liner are at axially spaced locations. A notch is formed between the axially spaced legs to make the bracket more thermally compliant along the axis of the jet engine.

In other features of this invention, the bracket is riveted to the liner. the use of the rivet provides a further ability to adjust to any relatively thermal expansion between the upstream and downstream locations, and also allows circumferential adjustment.

These and other features of the present invention can be best understood from the following specification and drawings, the following of which is a brief description.

DETAILED DESCRIPTION OF THE PREFERRED EMBODIMENT

Figure 1:
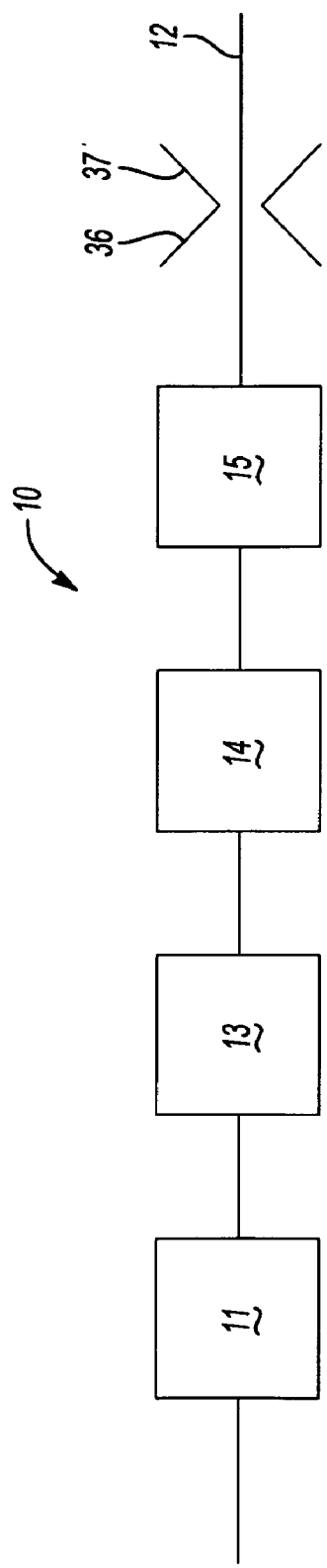
FIG. 1 is a cross-sectional view of a jet engine as known in the prior art.

FIG. 1 shows a gas turbine engine 10. As known, a fan section 11 moves air and rotates about an axial center line 12. A compressor section 13, a combustion section 14, and a turbine section 15 are also centered on the axial center line 12. A nozzle section of the turbine discharges gas downstream. A convergent section 36 leads into a throat and a divergent section 31 leads away. FIG. 1 is a schematic view, however, it does show the main components of the gas turbine engine.

Figure 2:
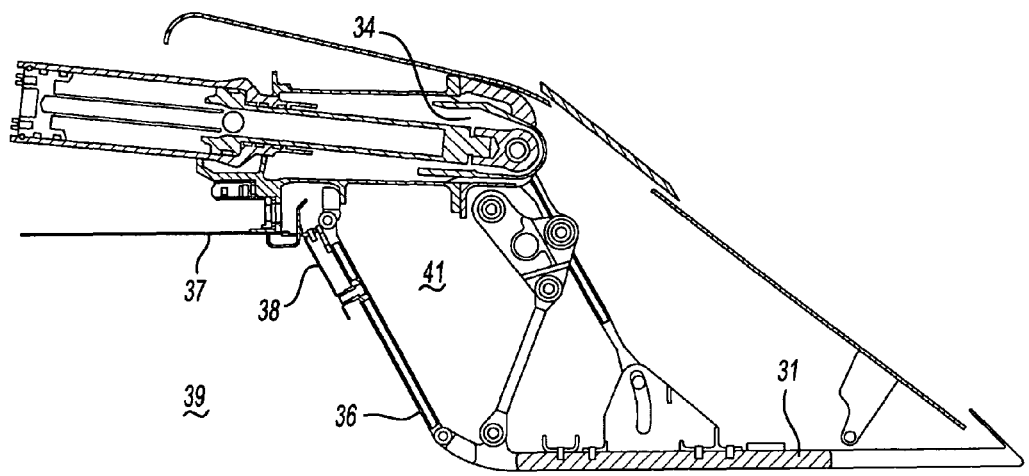
FIG. 2 shows a portion of a structure for adjusting the cross-sectional area of a nozzle.

FIG. 2 shows a prior art structure to change a cross-sectional area of the nozzle. As known, an actuator 34 drives a piston to cause the divergent section 31 and the convergent section 36 to pivot to change the cross-sectional area of the throat between the two. This structure is shown schematically, and may be as known in the art.

As shown at 36, convergent flaps and seals extend from a pivotal connection to the divergent section 31, and upwardly to a housing 37. This structure prevents hot gasses from an area 39 inward of the convergent section 36 from reaching a housing 41 housing the linkages and actuator 34. As known, a liner 38 faces the hot gas, and provides some thermal protection for the flap and seals 36.

Figure 3:
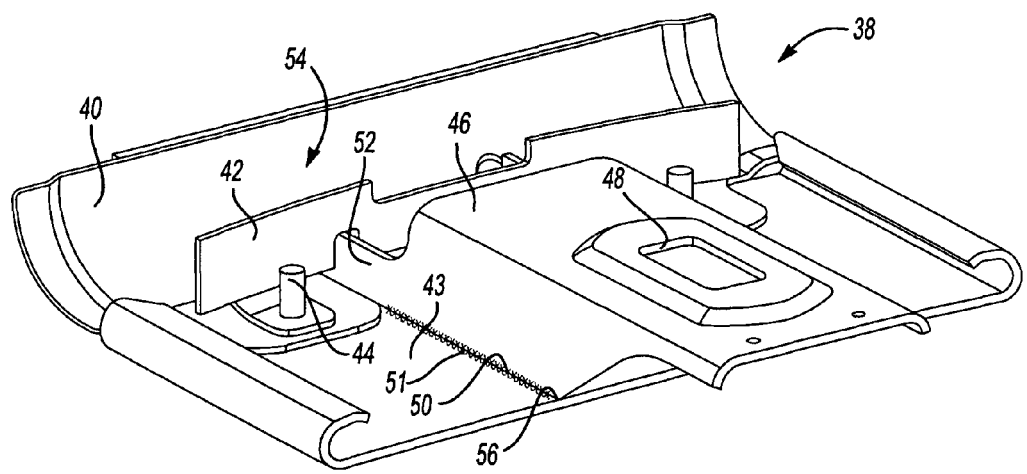
FIG. 3 shows a portion of a liner attachment as known in the prior art.

As shown at 38 in FIG. 3, in the prior art, this liner included a plate 40, a separate dam 42, and rivets 44 attaching the plate 40 to an underlying plate 43.

A bracket 46 includes an opening 48 to secure the liner 38 to the flap or seal. In addition, a lower surface 50 of the bracket 46 is welded at 51 to the plate 43 along its entire length. A forward portion 52 of the bracket 46 extends beyond the dam 42. As known, the dam 42 provides a pressure differential between an upstream area forward of the dam 42, and a downstream area adjacent to the bracket 46.

As explained above, in this prior art structure, an upstream end 54 of the bracket 46 is cooler than a downstream end 56. Thus, there is a thermal gradient along the lower surface 50 and the weld joint 51. This causes stresses and other challenges. The prior art has addressed these challenges by forming the bracket 46 out of materials such as columbium, which have low coefficients of thermal expansion (CTE). However, recently, it has become desirable to have more freedom in the material selected for the bracket 46. In one bracket, it is desirable to use INCO 625, which has a relatively high CTE.

Figure 4:
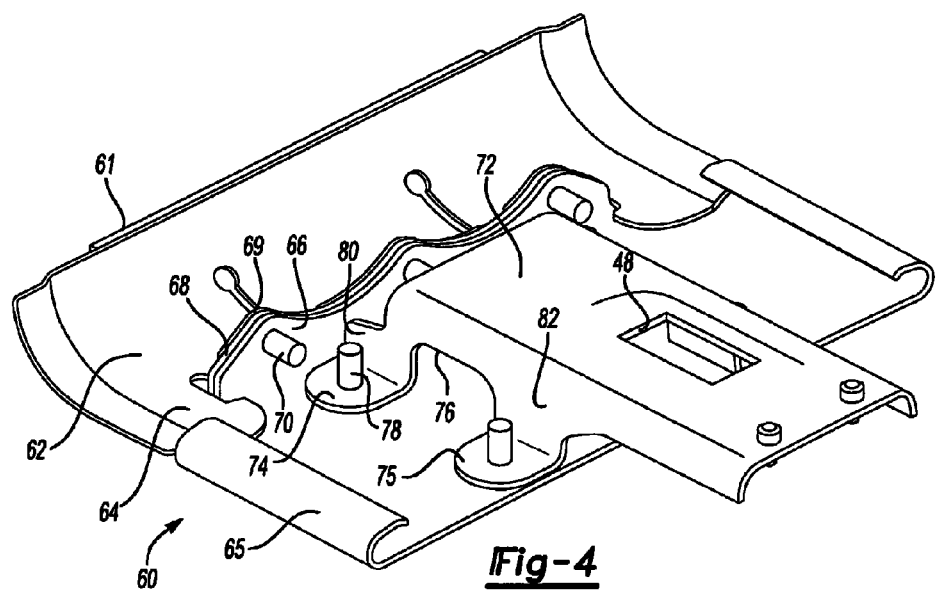
FIG. 4 shows an improved liner attachment.

As shown in FIG. 4, an inventive liner and bracket assembly 60 includes a pair of forward plates 61 and 62. A leg 64 on the rear plate 62 extends rearwardly. Another plate 65 has a rear face 66 abutting faces 68 and 69 from the plates 61 and 62. As shown, a rivet 70 connects the three plates. Features with regard to this structure can be best understood from co-pending patent application entitled "Axially Split Nozzle Liner for Convergent Nozzle," filed on even date herewith and assigned Ser. No. 11/540,279, now U.S. Pat. No. 7,685,825.

The improved bracket 72 has spaced legs 74 and 75 along with an intermediate notch 76. A second pair of legs 74 and 75 is on the opposed end of the bracket. That is, there are pairs of upstream and downstream legs on each circumferential side of each bracket. Rivets 78 secure the bracket 72 to the plate 65. Due to the notch 76, there are axially spaced legs 74 and 75, which contact the hot plate 65, reducing the footprint or contact area compared to the prior art. Notch 76 results in an area spaced away from the hot plate 65. Now, when the downstream end of the bracket is subjected to greater heat than the upstream end, the spaced legs can allow some adjustment, such as by the leg 75 expanding away from the leg 74, but with the expansion being compensated for within the notch 76.

Further, the inventive bracket 72 will provide some circumferential adjusting ability also due to the rivet connection at 78.

Figure 5:
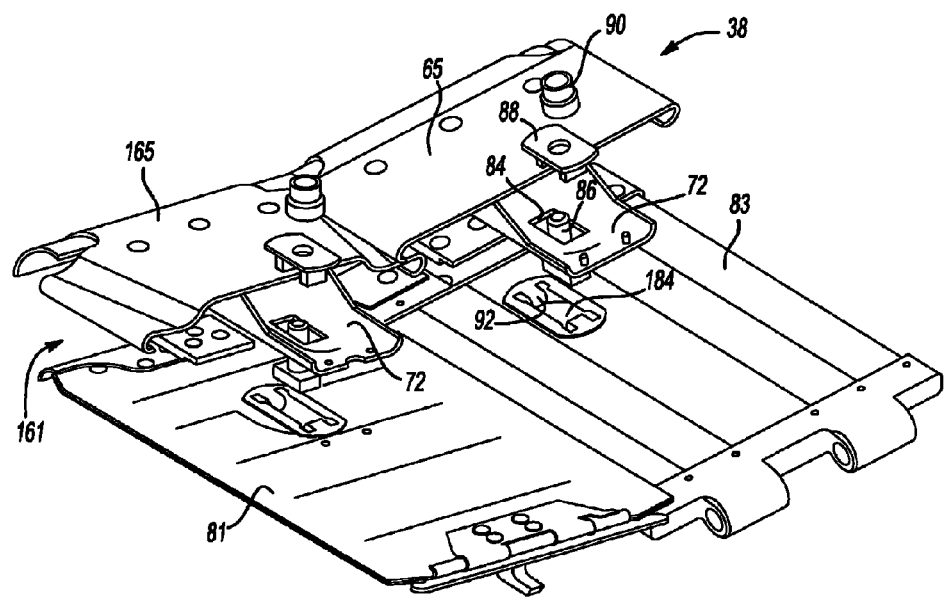
FIG. 5 is an exploded view of a convergent flap and seal along with the liner attachments.

As shown in FIG. 5, an 38 secures the liner and bracket to an underlying convergent flap 83. As known, an opening 184 in the flap 83 receives a bolt 86 through the opening 84 in the bracket 72. A washer 88 and nut 90 secure the bolt. The opening 184 in the flap 83 has spring fingers 92 which serve to hold the washer 88 during assembly. Features of this structure can be best understood from the co-pending application entitled "Quick Change Fastener System for Attaching Liner Bracket to Convergent Flap and Seal in Turbine Nozzle," filed on even date herewith, and assigned Ser. No. 11/529,836, now U.S. Pat. No. 7,617,685. The structure of the liner and bracket as shown in FIG. 5 is the prior art structure. This view is intended to provide an understanding of how the combined liner and bracket assembly is attached to the flap or seal. However, the quick change coupling is inventive to this application.

A similar bracket and liner arrangement 161 has backing plate 165, and is attached to a seal 81, again through an arrangement similar to that shown with regard to the flap 83.

Figure 6:
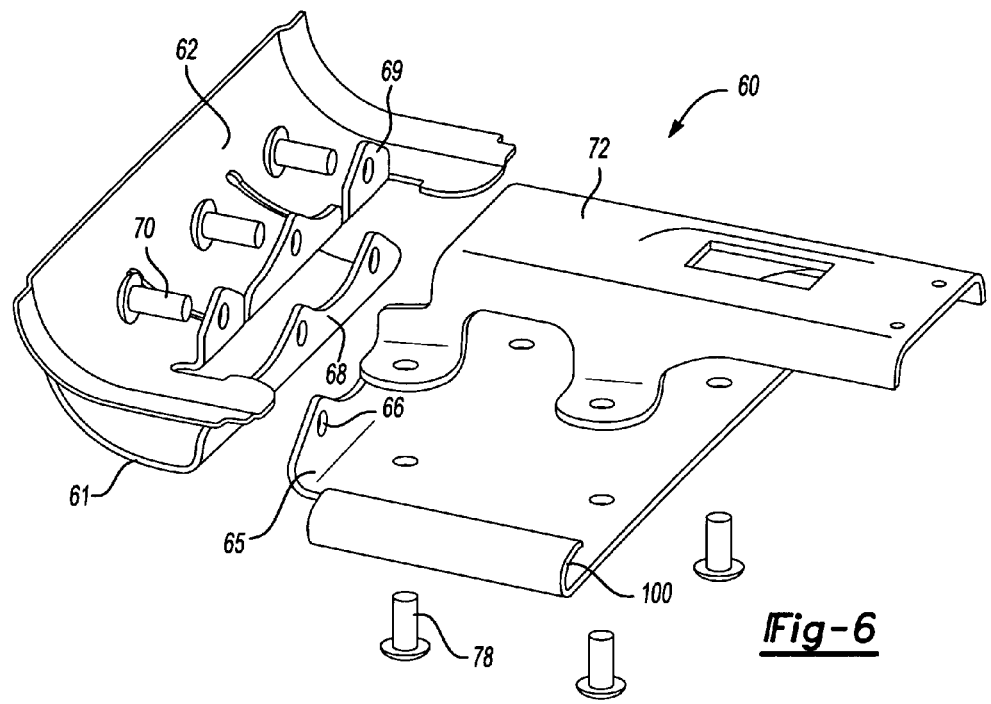
FIG. 6 is an exploded view of the improved flap liner attachment.

FIG. 6 is an exploded view of the liner and bracket assembly 60. As can be appreciated, the bracket 72 is positioned on the plate 65. The rivets 70 secure the plates 61, 62 and 65. An alternative rivet arrangement is disclosed in the co-pending patent application entitled "Thermally Compliant Rivet Connection for Connecting Turbine Engine Liner to Convergent Flap and Seal for Turbine Nozzle," filed on even date herewith and assigned Ser. No. 11/540,309, now U.S. Pat. No. 7,555,904.

Figure 7:
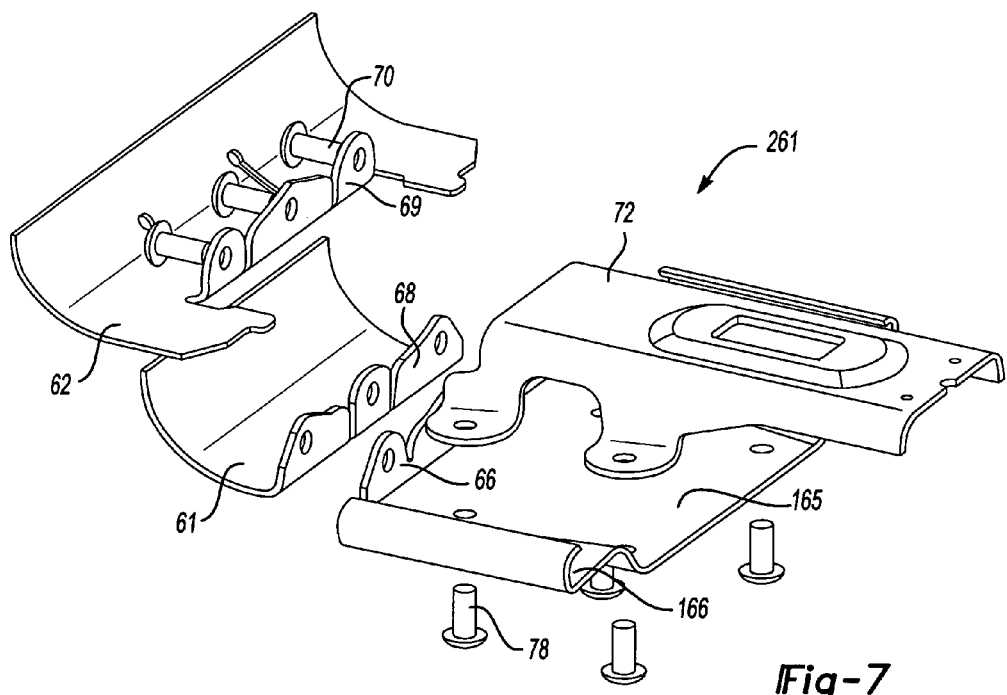
FIG. 7 is an exploded view of the improved seal attachment.

The plate 65 has a turned in end 100. FIG. 7 shows the similar liner and bracket assembly 261. In general, the difference is that the plate 165 has a more complex, turned in end 166.

Figure 8:
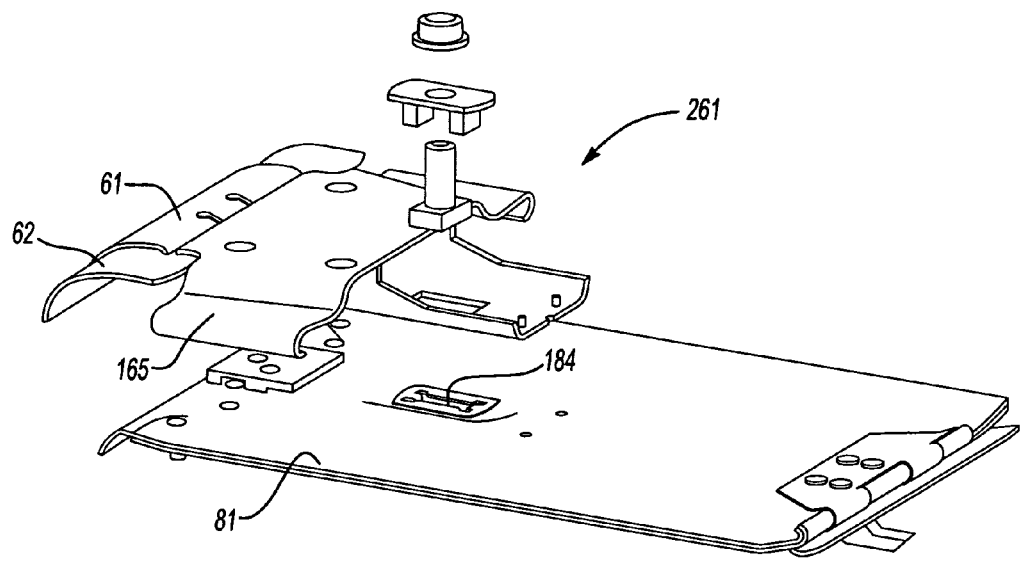
FIG. 8 is an exploded view of the seal.
Figure 9:
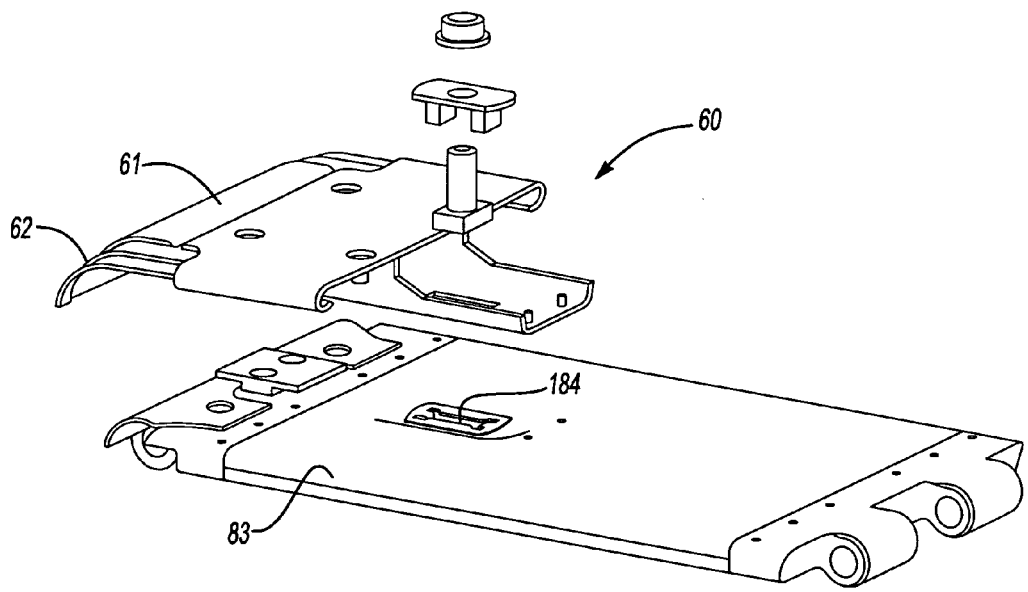
FIG. 9 is an exploded view of the flap.

FIG. 8 shows an exploded view of the components of the liner and bracket 261 to the convergent seals 81. FIG. 9 shows a similar exploded view of the components of the bracket and liner 60 being attached to the convergent flap 83.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A nozzle assembly for a gas turbine engine comprising:
   a plurality of divergent flaps that are movable to adjust a cross-sectional area of an outlet of a nozzle;
   a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals, and said convergent flaps and seals also being usable in conjunction with movement of said divergent flaps; and
   said convergent flaps and seals being connected to a liner facing inwardly and toward products of combustion, said liner being attached to said convergent flaps and seals by a bracket, said bracket being attached to said liner at contact areas spaced axially along a central axis of the nozzle, and there being locations where said bracket is spaced away from said liner intermediate said spaced contact areas.

2. The nozzle assembly as set forth in claim 1, wherein said bracket has upstream and downstream feet which are connected to said liner, and an intermediate notch allows thermal expansion between said spaced feet and providing said locations.

3. The nozzle assembly as set forth in claim 2, wherein there are pairs of feet on circumferentially opposed sides of said bracket, and said feet within each pair spaced along said central axis.

4. The nozzle assembly as set forth in claim 3, wherein said contact areas are connected to said liner by rivets.

5. The nozzle assembly as set forth in claim 1, wherein said contact areas are connected to said liner by mechanism fasteners.

6. The nozzle assembly as set forth in claim 5, wherein said mechanical fasteners are rivets.

7. A nozzle assembly for a gas turbine engine comprising:
   a plurality of divergent flaps that are movable to adjust a cross-sectional area of an outlet of a nozzle;
   a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals, and said convergent flaps and seals also being usable in conjunction with movement of said divergent flaps; and
   said convergent flaps and seals being connected to a liner facing inwardly and toward products of combustion, said liner being attached to said rear flaps and seals by a bracket, said bracket being attached to said liner by a separate mechanical fastener.

8. The nozzle assembly as set forth in claim 7, wherein said bracket has upstream and downstream feet which are connected to said liner, and an intermediate notch allows thermal expansion between said two spaced feet.

9. The nozzle assembly as set forth in claim 8, wherein there are pairs of feet on circumferentially opposed sides of said bracket, and said feet within each pair spaced along said central axis.

10. The nozzle assembly as set forth in claim 7, wherein said mechanical fasteners are rivets.

11. A gas turbine engine comprising:
a fan section;
a compressor section;
a combustion section;
a turbine section; and
a nozzle section, said nozzle including a plurality of divergent flaps that are movable to adjust a cross-sectional area of an outlet of a nozzle; a plurality of convergent, flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals, and said convergent flaps and seals also being usable in conjunction with movement of said divergent flaps said convergent flaps and seals being connected to a liner facing inwardly and toward products of combustion, said liner being attached to said convergent flaps and seals by a bracket, said bracket being attached to said liner at contact areas spaced axially along a central axis of the nozzle, and there being locations where said bracket is spaced away from said liner intermediate said spaced contact areas.

12. The gas turbine engine as set forth in claim 11, wherein said bracket has upstream and downstream feet which are connected to said liner, and an intermediate notch allows thermal expansion between said spaced feet and providing said locations.

13. The gas turbine engine as set forth in claim 12, wherein there are pairs of feet on circumferentially opposed sides of said bracket, and said feet within each pair spaced along said central axis.

14. The gas turbine engine as set forth in claim 13, wherein said contact areas are connected to said liner by rivets.

15. The gas turbine engine as set forth in claim 11, wherein said contact areas are connected to said liner by mechanism fasteners.

16. The gas turbine engine as set forth in claim 15, wherein said mechanical fasteners are rivets.

* * * * *